No. 712,556. Patented Nov. 4, 1902.
H. LEAR.
COMBINED COASTING HUB AND BRAKE FOR BICYCLES.
(Application filed Jan. 7, 1902.)
(No Model.)
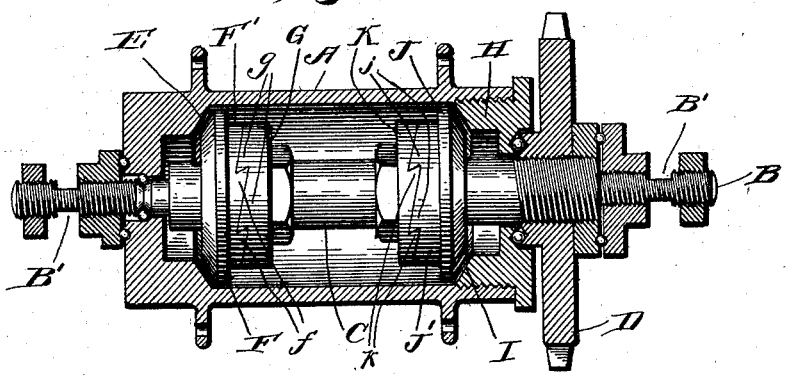
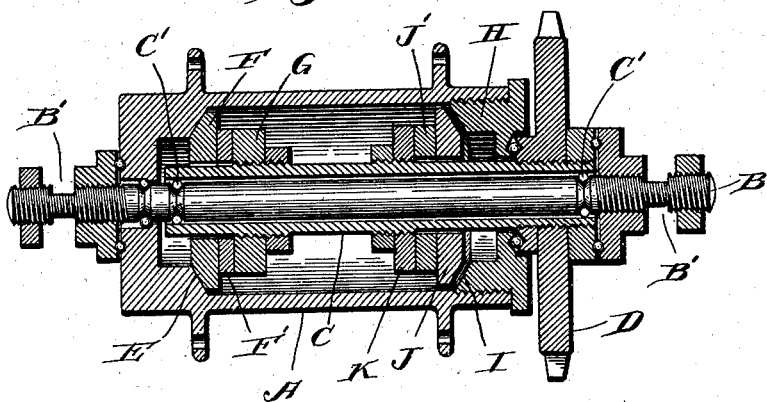
Witnesses:
Louis D. Heinrichs
L. H. Morrison
Inventor
Henry Lear
By W. Preston Williamson
Atty
THE NORRIS PETERS CO., PHOTO-LITHO., WASHINGTON, D. C.

UNITED STATES PATENT OFFICE.

HENRY LEAR, OF NEWPORT, KENTUCKY.

COMBINED COASTING HUB AND BRAKE FOR BICYCLES.

SPECIFICATION forming part of Letters Patent No. 712,556, dated November 4, 1902.

Application filed January 7, 1902. Serial No. 88,769. (No model.)

*To all whom it may concern:*

Be it known that I, HENRY LEAR, a citizen of the United States, residing at Newport, county of Campbell, and State of Kentucky, have invented a certain new and useful Improvement in a Combined Coasting Hub and Brake for Bicycles, of which the following is a specification.

My invention relates to a new and useful improvement in a combined coasting hub and brake for bicycles, and has for its object to provide a hub of this description which will consist of comparatively few parts, and thereby be very simple in construction, yet durable and efficient in action.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 represents a sectional view of the hub, showing the interior portions in elevation and the parts in the position they would assume while coasting or when the sprocket-wheel was stationary. Fig. 2 is a longitudinal section through the hub and also through the interior parts, said parts being in the position they would assume when the bicycle was traveling forward.

In the drawings, A represents the hub of a bicycle-wheel, and B is the stationary axle, which is adapted to be secured at the points B' to the forks of the bicycle.

C is a sleeve which is adapted to rotate upon the stationary axle upon the ball-bearings C'. This sleeve extends outside of one end of the hub A and has secured thereon in any suitable manner the sprocket-wheel D.

Near the closed end of the hub A upon the interior is formed the beveled friction-surface E.

F is a beveled frictional disk beveled to correspond to the bevel E. This disk is journaled loosely upon the sleeve C.

F' is a hub secured to the disk F, and the face of this hub has formed thereon the cam-teeth *f*.

G is a collar which is secured rigidly to the sleeve C, so as to rotate therewith, and this collar has cam-teeth *g* formed upon its face, and these cam-teeth are oppositely disposed toward the cam-teeth *f* of the disk F. These teeth are so formed that when the sprocket-wheel D is rotated to drive the bicycle forward the bevel upon the teeth *g* will ride upward upon the bevel of the teeth *f*, and thus force the disk F along the sleeve and into contact with the beveled surfaces E, and the more power there is applied to the sprocket-wheel the tighter the disk will be forced in contact with the beveled surface, and thus rotate the hub in the forward direction, so as to drive the bicycle forward.

In the opposite end of the hub A is threaded a plug H, which has formed upon its interior end the frictional beveled surfaces I.

J is a disk having a beveled surface to correspond to the beveled surface I, and this disk is similar to the disk F at the other end of the sleeve.

J' is a hub formed upon the disk, and this hub has formed in its face the cam-teeth *j*.

K is a collar secured rigidly to the sleeve C, and the face of this collar has formed thereon the cam-teeth *k*. These cam-teeth are formed and beveled in an opposite direction to the cam-teeth *f* and *g*, formed upon the opposite disk and collar, and the cam-teeth at both ends of the sleeve are slightly undercut, so that when the bicycle is being driven forward and the disk F is forced in contact with the beveled surface E by the teeth upon the collar G the teeth *k* upon the collar K will then hold the disk J out of contact with the beveled surface I, and thus will not interfere with the forward movement of the bicycle.

When it is desired to coast, the feet of the rider are held stationary, thereby stopping the sprocket-wheel D, in which case the sleeve C will be held stationary, and then the disk F will ride back upon the sleeve C out of engagement with the frictional surface E, and then both disks F and J will be out of engagement with the hub, and the wheel will be carried forward by its own momentum. When it is desired to arrest the momentum of the wheel, the sprocket-wheel D is given a slight backward movement, which will cause the teeth k of the collar K to act against the beveled portion of the teeth j of the disk J and force said disk into frictional contact with the beveled surface I, and if the rider continues to exert the backward pressure upon the sprocket-wheel D the disk J will be held stationary and the hub A caused to slide upon the disk, which will retard the movement of the bicycle, and the bicycle will be stopped quickly or gradually, according to the pressure exerted by the rider.

Of course I do not wish to be limited to the exact construction here shown, as slight modifications could be made without departing from the spirit of my invention.

Having thus fully described my invention, what I claim as new and useful is—

1. In a combined coasting hub and brake, a stationary shaft adapted to be secured to the forks of the bicycle, a hub journaled upon the shaft, a sleeve also journaled upon the shaft, a sprocket-wheel secured to one end of the sleeve, frictional surfaces formed upon the interior of the hub at each end thereof, frictional disks journaled loosely upon the sleeve and arranged in juxtaposition to the frictional surfaces, cam-teeth formed upon the inner face of the frictional disks, two collars secured rigidly to the sleeve, cam-teeth formed upon each of the collars, the cam-teeth of the two different sets of collars and disks so beveled as to operate in opposite directions to one another, substantially as and for the purpose set forth.

2. In a combined coasting hub and brake, a stationary axle adapted to be secured to the forks of the bicycle, a hub journaled upon the axle, a sleeve also journaled upon the stationary axle, frictional surfaces formed upon each end of the interior of the hub, two frictional disks arranged in juxtaposition to the frictional surfaces and journaled loosely upon the sleeve, hubs formed upon each of the frictional disks, beveled cam-teeth formed upon the inner face of each of the hubs, two collars secured to the sleeve, beveled cam-teeth formed in the outer face of each of the collars to correspond to the cam-teeth of the hubs upon the disks, said beveled cam-teeth of the different collars to be so beveled as to operate in opposite directions to one another, and said cam-teeth being undercut, a sprocket-wheel secured rigidly to one end of the sleeve, substantially as and for the purpose specified.

3. In a device of the character described, a stationary axle adapted to be secured at each end to the brake of the bicycle, a hub journaled upon the stationary axle, a sleeve also journaled upon the stationary axle and extending outside of the hub at one end, a sprocket-wheel secured rigidly to this protruding end of the sleeve, a beveled frictional surface formed upon the interior of the hub at the end opposite the sprocket-wheel, a plug threaded in the other end of the hub, a beveled frictional surface formed upon the inner face of said plug, two beveled frictional disks, each arranged in juxtaposition to the beveled frictional surfaces and journaled loosely upon the sleeve, beveled cam-teeth carried by the frictional disks, two collars secured to the sleeve, beveled cam-teeth carried by said collars, said cam-teeth being oppositely disposed to the cam-teeth upon the disks, and the cam-teeth of each set of collars and disks being so cut as to operate in opposite directions to one another, as and for the purpose specified.

In testimony whereof I have hereunto affixed my signature in the presence of two subscribing witnesses.

HENRY LEAR.

Witnesses:
SARAH A. BENTON,
ARTHUR FREY.